United States Patent Office 3,244,482
Patented Apr. 5, 1966

3,244,482
ULTRAFINE TITANIUM BORIDE
James B. Culbertson, Lockport, Headlee Lamprey, Lewiston, and Robert L. Ripley, Lockport, N.Y., assignors to Union Carbide Corporation, a corporation of New York
No Drawing. Filed May 3, 1961, Ser. No. 107,299
6 Claims. (Cl. 23—204)

The present invention relates to ultrafine powders of titanium boride, the ultrafine powders being formed of substantially uniform sub-micron particles. More particularly, the present invention relates to a process for producing ultrafine powders of titanium boride formed of substantially uniform particles having a diameter of less than about 0.1 micron.

The ultrafine powders of the present invention have particular utility in the dispersion hardening of aluminum.

It is an object of the present invention to provide a process for producing uniform ultrafine powders of titanium boride, the particles of the powders derived from the process being less than about 1 micron in diameter.

It is another object to provide a process for producing uniform ultrafine powders of titanium boride formed of particles having a grain size of less than about 0.1 micron.

These and other objects will be apparent from the following description and claims.

It has been discovered that uniform, sub-micron titanium boride powders formed of sub-micron particles having substantially the same size and shape can be produced continuously and in commercially significant amounts by practicing the process of the present invention which comprises introducing titanium halide vapor and boron halide vapor into a reaction zone located within a reactor and spaced from all surfaces thereof; forming sub-micron particles of titanium boride away from all surfaces of the reactor by spontaneously co-reducing the titanium halide vapor and the boron halide vapor with sodium vapor only within the reaction zone; rapidly removing the thus formed sub-micron particles from contact with the reacting vapors and subjecting the sub-micron titanium boride particles to a temperature which will limit particle grain growth to a predeterimned sub-micron size.

The process of the present invention is practiced in a horizontally disposed, cylindrically shaped, steel coated reactor. Three concentric nozzles are arranged to communicate with the reactor at one end. A mixture of $TiCl_4$ vapor and $BCl_3$ vapor is introduced into the reactor through the inner nozzle, argon gas is passed through the middle nozzle to sheath the halide vapor mixture, and Na vapor is introduced through the outer nozzle. The gas and vapor flow through the various nozzles is controlled so that the halide vapor and Na vapor admix and react only in a reaction zone, within the reactor, which is spaced away from all reactor surfaces. The incoming vapors are pre-heated to a temperature which will provide a spontaneous and continuous titanium boride particle-forming reaction only in the reaction zone; the temperature in the reactor adjacently surrounding the reaction zone is maintained below about 1200° C. and preferably below about 900° C. Solid sub-micron particles of titanium boride are formed in the reaction zone and are rapidly removed therefrom to a temperature which will limit grain growth of the particles to the predetermined sub-micron size, i.e., below about 1200° C. and preferably below about 900° C. The rapid removal of the sub-micron particles from the reaction zone is accomplished by the stream of argon sheath gas, unreacted vapor, and by-product vapor. The sub-micron particles, by-product material and unreacted material are collected in a condenser or other suitable device which communicates with the reactor at the end opposite the inlet nozzles; the particles of titanium boride are recovered from the condensed material by leaching. The product obtained is an ultrafine titanium boride powder formed of sub-micron particles of substantially the same size and shape.

In the practice of the present invention, to prevent the formation of particles greater than sub-micron size, the sub-micron particles which are formed in the reaction zone are rapidly removed from contact with reacting halide vapor and reductant; additionally, the turbulence, velocity and directions of the gases in the reactor are controlled so that the sub-micron particles, as they are formed, can freely exit the reaction zone and are not dispersed in the reactor. Maintaining the turbulence in the reactor at a minimum is important in order to ensure that the sub-micron particles are not retained in a high temperature region for any extended period of time since it is essential that the sub-micron particles formed in the reaction zone be rapidly exposed to a temperature which will limit the particle grain growth to the desired sub-micron size. For example, in order to produce a uniform powder of less than about 1 micron, the sub-micron particles which are formed in the reaction zone are rapidly removed therefrom and subjected to a temperature below about 1200° C. Temperature above this value tend to cause the production of larger particles and the uniformity of the powder is adversely affected. A temperature of about 900° C. is employed to ensure the production of a uniform powder formed of about 0.1 micron particles. Lower temperatures provide increasingly smaller sized particles.

It is an essential feature of the present invention that the reactor in which the titanium boride powder is produced be arranged to permit the sub-micron particle-forming reaction to take place in space, i.e., remote from all reactor walls and substrate. If the reacting vapors are allowed to impinge on the reactor surfaces while the product powder is being formed, relatively large deposits will be produced which are more or less continuous rather than powdery. These larger deposits are considerably greater than 1 micron in size, and unless their formation is prevented, these larger particles will contaminate the product.

The following example will serve to illustrate the process of the present invention.

Example I

Sodium vapor, in the amount of 31.5 pounds, and 42 pounds of a 1:2 mixture of $TiCl_2 + BCl_3$ were introduced into a steel coated reactor (12 inches diameter by 40 inches long) over a period of 45 minutes. The sodium feed was 140 percent of stoichiometric. The sodium vapor and halide vapors were spontaneously reacted in a reaction zone located within the reactor and spaced away from all surfaces thereof. The temperature in the portion of the reactor adjacently surrounding the reaction zone was maintained at about 800° C. Sub-micron particles of titanium boride were formed in the reaction zone by the co-reduction of $TiCl_4$ and $BCl_3$ with sodium and the sub-micron particles together with by-product vapors and unreacted material were rapidly and continuously removed from the reaction zone to a temperature of about 800° C. The sub-micron particles and by-product and unreacted materials were collected, and after leaching with a mixture of acetone and water a uniform fine black powder was obtained which was free-flowing and pyrophoric on exposure to air. X-ray diffraction analysis showed only $TiB_2$. Further analysis of the product powder showed 2.3 percent iron, 0.8 percent chlorine and some moisture oxygen. Particle surface area was 13.7 m.$^2$/g. and the average particle diameter was 0.1 micron.

Example II

A cylindrically-shaped reactor is provided having three concentric nozzles communicating therewith at one end. One mole of TiCl$_4$ liquid and two moles of BCl$_3$ liquid are admixed and the mixture is pre-heated to 900° C. The resultant vapor mixture is introduced into the reactor through the inner nozzle over a period of one hour. Argon gas, pre-heated to 900° C. is introduced through the middle nozzle at a rate of 5 moles per hour to sheath the halide vapor mixture. Simultaneously, sodium vapor at a temperature of 900° C. is introduced from an evaporator through the outer nozzle at a rate of 7 moles per hour; the sodium vapor is introduced into the reactor for a one-hour period. The halide vapor mixture and sodium vapor react exothermically in a reaction zone within the reactor spaced away from all surfaces thereof. Sub-micron particles of TiB$_2$ are produced in the reaction zone out of contact with all reactor surfaces. The sub-micron TiB$_2$ particles are rapidly removed from the reaction zone, together with by-product NaCl vapor, to a cooler zone maintained at a temperature of 900° C. The NaCl condenses around the sub-micron TiB$_2$ particles in the cooler zone. The NaCl is subsequently separated from the TiB$_2$ particles by vacuum distillation at 900° C. and a uniform sub-micron TiB$_2$ powder is obtained having an average particle size of 0.1 micron.

It is to be understood that the separation of the sub-micron particles of titanium boride from the by-product and unreacted vapors, before the condensation thereof, is also considered to be within the scope of the present invention. This can be accomplished by conducting the reaction at reduced pressures and providing conventional condensers or precipitators.

In the practice of the present invention, the average particle size of the powder produced can be controlled by varying the quenching temperature, i.e. the temperature to which the particles are rapidly removed from the reaction zone, the lower temperatures providing smaller particle size. The powders thus obtained are characterized by being formed of particles of substantially the same size and shape. That is substantially more than a major proportion of the particles correspond to the average particle size. The characteristic uniformity of the powder is of utility in the dispersion hardening of aluminum metal.

What is claimed is:

1. A process for producing uniform sub-micron powders of titanium boride which comprises introducing titanium halide vapor, boron halide vapor and sodium vapor into a reaction zone located within a reactor and spaced away from all surfaces thereof; spontaneously co-reducing the titanium halide vapor and the boron halide vapor with the sodium vapor only in the reaction zone to form sub-micron particles of titanium boride out of contact with all surfaces of the reactor; rapidly removing the thus formed sub-micron particles from contact with reacting vapors and subjecting the sub-micron titanium particles to a temperature which limits particle grain growth to a predetermined sub-micron size.

2. A process in accordance with claim 1 wherein the sub-micron particles formed in the reaction zone are rapidly removed therefrom and subjected to a temperature of below 1200° C.

3. A process in accordance with claim 1 wherein the sub-micron particles formed in the reaction zone are rapidly removed therefrom and subjected to a temperature of about 800° C. to about 900° C.

4. A process for producing uniform sub-micron powders of titanium boride which comprises introducing TiCl$_4$ vapor, BCl$_3$ vapor and sodium vapor into a reaction zone located within a reactor and spaced away from all surfaces thereof; spontaneously co-reducing the titanium halide vapor and the boron halide vapor with the sodium vapor only in the reaction zone to form sub-micron particles of titanium boride out of contact with all surfaces of the reactor; rapidly removing the thus formed sub-micron particles from contact with reacting vapors and subjecting the sub-micron titanium particles to a temperature which limits particle grain growth to a predetermined sub-micron size.

5. A process in accordance with claim 4 wherein the sub-micron particles formed in the reaction zone are rapidly removed therefrom and subjected to a temperature of below 1200° C.

6. A process in accordance with claim 4 wherein the sub-micron particles formed in the reaction zone are rapidly removed therefrom and subjected to a temperature of about 800° C. to about 900° C.

References Cited by the Examiner

UNITED STATES PATENTS

| 1,306,568 | 6/1919 | Weintraub | 23—209 |
| 2,789,886 | 4/1957 | Kruas et al. | 23—202 |

FOREIGN PATENTS

| 435,754 | 9/1935 | Great Britain. |

OTHER REFERENCES

Barbor et al.: "General College Chemistry," 1940, p. 12.

MAURICE A. BRINDISI, *Primary Examiner.*